(12) United States Patent　　(10) Patent No.: US 8,974,952 B2
Kim et al.　　(45) Date of Patent: Mar. 10, 2015

(54) RECHARGEABLE BATTERY

(75) Inventors: Jun-Sik Kim, Yongin-si (KR); Po-Jung Hwang, Yongin-si (KR); Seung-Jae Lee, Yongin-si (KR); Yoo-Myung Kang, Yongin-si (KR); Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 402 days.

(21) Appl. No.: 12/860,692

(22) Filed: Aug. 20, 2010

(65) Prior Publication Data

US 2011/0086262 A1　Apr. 14, 2011

Related U.S. Application Data

(60) Provisional application No. 61/251,243, filed on Oct. 13, 2009.

(51) Int. Cl.
| | |
|---|---|
| *H01M 2/02* | (2006.01) |
| *H01M 2/06* | (2006.01) |
| *H01M 2/26* | (2006.01) |
| *H01M 2/30* | (2006.01) |

(52) U.S. Cl.
CPC .......... *H01M 2/0212* (2013.01); *H01M 2/0277* (2013.01); *H01M 2/0285* (2013.01); *H01M 2/266* (2013.01); *H01M 2/30* (2013.01); *H01M 2/0287* (2013.01)
USPC ............ 429/163; 429/175; 429/179; 429/185

(58) Field of Classification Search
None
See application file for complete search history.

(56) References Cited

U.S. PATENT DOCUMENTS 5,583,418 A * 12/1996 Honda et al. .................. 320/109
5,948,560 A *  9/1999 Verhoog et al. .............. 429/160

(Continued)

FOREIGN PATENT DOCUMENTS

| CN | 1914748 A | 2/2007 |
|---|---|---|
| CN | 101536212 A | 9/2009 |

(Continued)

OTHER PUBLICATIONS

Office Action dated Dec. 4, 2012 for corresponding JP Application No. 2010-225755.

(Continued)

*Primary Examiner* — Gregg Cantelmo
(74) *Attorney, Agent, or Firm* — Knobbe Martens Olson & Bear LLP (57) ABSTRACT

A rechargeable battery is disclosed. The rechargeable battery comprises: a central electrode portion comprising a positive electrode, a negative electrode and a separator; a first electrode portion extending from a first end of the central electrode portion; a second electrode portion extending from a second end of the central electrode portion opposite the first end; a central case enclosing the central electrode portion; a first electrode case enclosing the first electrode portion, wherein the first electrode case is coupled to the central case such that an overlapping part of the first electrode case encloses a part of the central electrode portion at the first end, and the central case encloses the overlapping part of the first electrode case; and a second electrode case enclosing the second electrode portion, wherein the second electrode case is coupled to the central case such that an overlapping part of the second electrode case encloses a part of the central electrode portion at the second end, and the central case encloses the overlapping part of the second electrode case.

27 Claims, 5 Drawing Sheets

(56) References Cited

U.S. PATENT DOCUMENTS

| | | | |
|---|---|---|---|
| 5,985,480 A * | 11/1999 | Sato et al. ................ 429/65 |
| 6,027,831 A * | 2/2000 | Inoue et al. ............... 429/181 |
| 6,083,640 A | 7/2000 | Lee et al. |
| 7,410,723 B2 * | 8/2008 | Kim et al. ................ 429/175 |
| 7,582,379 B2 | 9/2009 | Yoon et al. |
| 2004/0033416 A1 | 2/2004 | Kim et al. |
| 2006/0110658 A1 * | 5/2006 | Zhu et al. ................ 429/208 |
| 2007/0196732 A1 | 8/2007 | Tatebayashi et al. |
| 2007/0207378 A1 | 9/2007 | Mizuta |
| 2007/0231685 A1 | 10/2007 | Takeuchi et al. |
| 2009/0263712 A1 | 10/2009 | Mizuta et al. |
| 2010/0143787 A1 | 6/2010 | Jung et al. |

FOREIGN PATENT DOCUMENTS

| | | |
|---|---|---|
| EP | 1035597 A1 | 9/2000 |
| JP | 2002-231214 | 8/2002 |
| JP | 2003-272572 A | 9/2003 |
| JP | 2003-346743 | 12/2003 |
| JP | 2004-087432 | 3/2004 |
| JP | 2004-355915 | 12/2004 |
| JP | 2005-317312 | 11/2005 |
| JP | 2007-227090 A | 9/2007 |
| KR | 10-2000-0020533 | 4/2000 |
| KR | 10-2007-0004848 | 1/2007 |
| KR | 10-2007-0012842 | 1/2007 |
| WO | WO 2005/086258 | 9/2005 |
| WO | WO 2007/105541 | 9/2007 |
| WO | WO 2008/023903 A1 | 2/2008 |

OTHER PUBLICATIONS

Office Action dated Dec. 27, 2012 for corresponding CN Application No. 201010506889.2.

Extended European Search Report dated Jan. 28, 2013 for EP Application No. 10251774.5.

* cited by examiner

RECHARGEABLE BATTERY

CROSS-REFERENCE TO RELATED APPLICATIONS

This application claims priority to and the benefit of U.S. Provisional Application No. 61/251,243, filed on Oct. 13, 2009, the entire content of which is incorporated herein by reference.

BACKGROUND

1. Field

The present disclosure relates to a rechargeable battery. More particularly, the present disclosure relates to a structure of a case that houses an electrode group.

2. Description of the Related Technology

A rechargeable battery typically includes an electrode group that includes an positive electrode, a separator, and a negative electrode, a case that houses the electrode group, and an electrode terminal that is connected to the electrode group and that is drawn out to the outside of the case. The case can be formed with a laminate sheet in which a metal layer and a resin layer are bonded, and a rechargeable battery having the case is referred to as a pouch type battery.

A common pouch type battery is typically formed by fixing a positive electrode terminal and a negative electrode terminal by welding to a positive electrode uncoated portion and a negative electrode uncoated portion, respectively, of the electrode group, housing the entire electrode group, a part of the positive electrode terminal and the negative electrode terminal in the internal space of the case with an electrolyte solution. The battery is then typically sealed by bonding edges of the upper case and the lower case by thermal bonding.

However, in the above-described structure, a welding portion of the electrode group and the electrode terminal, a sealing portion of the upper case and the lower case, and a drawn-out portion of the electrode terminal are sequentially positioned at the outside of the electrode group. Therefore, because a portion that does not contribute to an actual battery reaction in the entire rechargeable battery occupies a large area, the entire volume is expanded. Thus, it is disadvantageous to form the rechargeable battery to have high capacity and a compact size.

Moreover, when thermal bonding the upper case and the lower case, the upper case is sealed to the lower case by deep drawing the upper case. In this case, because the edge of the upper case becomes weak by the deep drawing, the case can be easily damaged by an external impact, and thus reliability of the rechargeable battery is deteriorated.

The above is only provided to enhance understanding of the background of the invention and therefore it may contain information that does not form the prior art that is already known in this country to a person of ordinary skill in the art.

SUMMARY

Embodiments of the present invention provide for a rechargeable battery having the advantages of high capacity and a compact size by reducing the area of a portion that does not contribute to battery reactions outside the electrode group.

An embodiment of the present invention provides a rechargeable battery comprising: a central electrode portion comprising a positive electrode, a negative electrode and a separator; a first electrode portion extending from a first end of the central electrode portion; a second electrode portion extending from a second end of the central electrode portion opposite the first end; a central case enclosing the central electrode portion; a first electrode case enclosing the first electrode portion, wherein the first electrode case is coupled to the central case such that an overlapping part of the first electrode case encloses a part of the central electrode portion at the first end, and the central case encloses the overlapping part of the first electrode case; and a second electrode case enclosing the second electrode portion, wherein the second electrode case is coupled to the central case such that an overlapping part of the second electrode case encloses a part of the central electrode portion at the second end, and the central case encloses the overlapping part of the second electrode case.

According to another embodiment, a rechargeable battery comprises: a central electrode portion comprising a positive electrode, a negative electrode and a separator; a first electrode portion extending from a first end of the central portion; a second electrode portion extending from a second end of the central portion opposite the first end; a central case enclosing the central electrode portion; a first electrode case enclosing the first electrode portion; and a second electrode case enclosing the second electrode portion; wherein at least one of the first or second electrode cases is bent.

DETAILED DESCRIPTION OF THE EMBODIMENTS

Embodiments of the present invention will be described more fully hereinafter with reference to the accompanying drawings. As those skilled in the art would realize, the described embodiments may be modified in various different ways, all without departing from the spirit or scope of the present invention.

Figure 1:
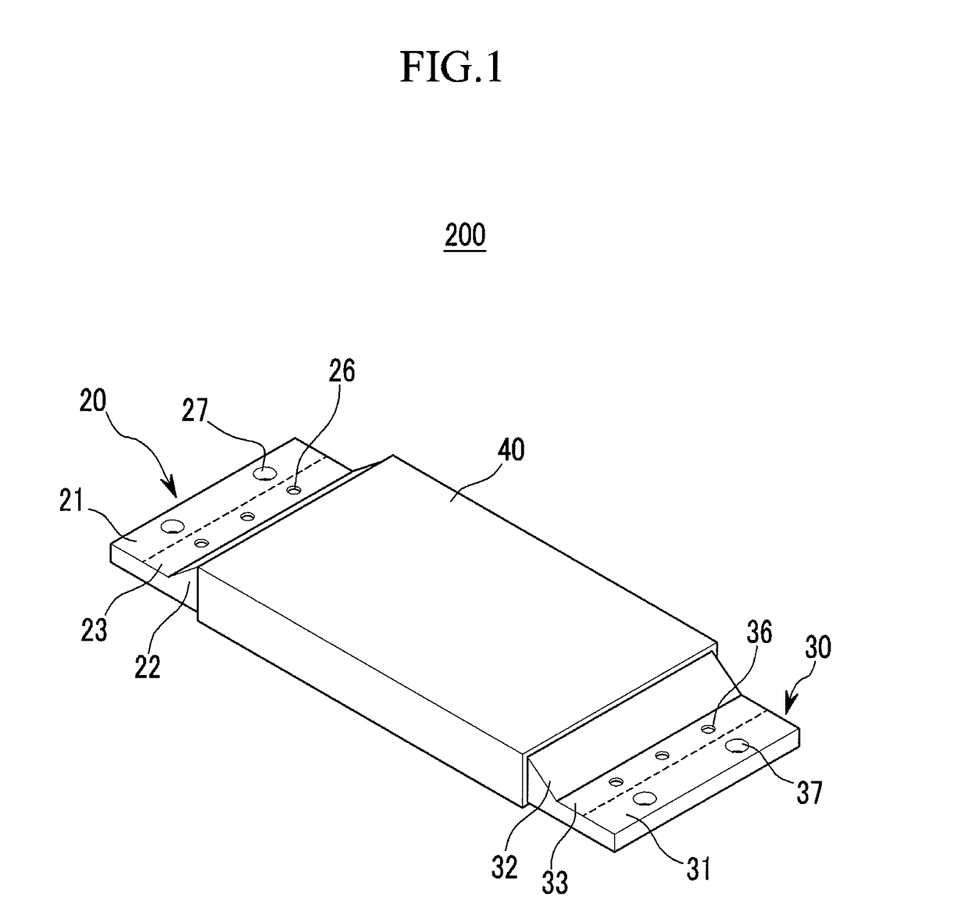
FIG. 1 is a perspective view of a rechargeable battery according to one embodiment of the present invention.
Figure 2:
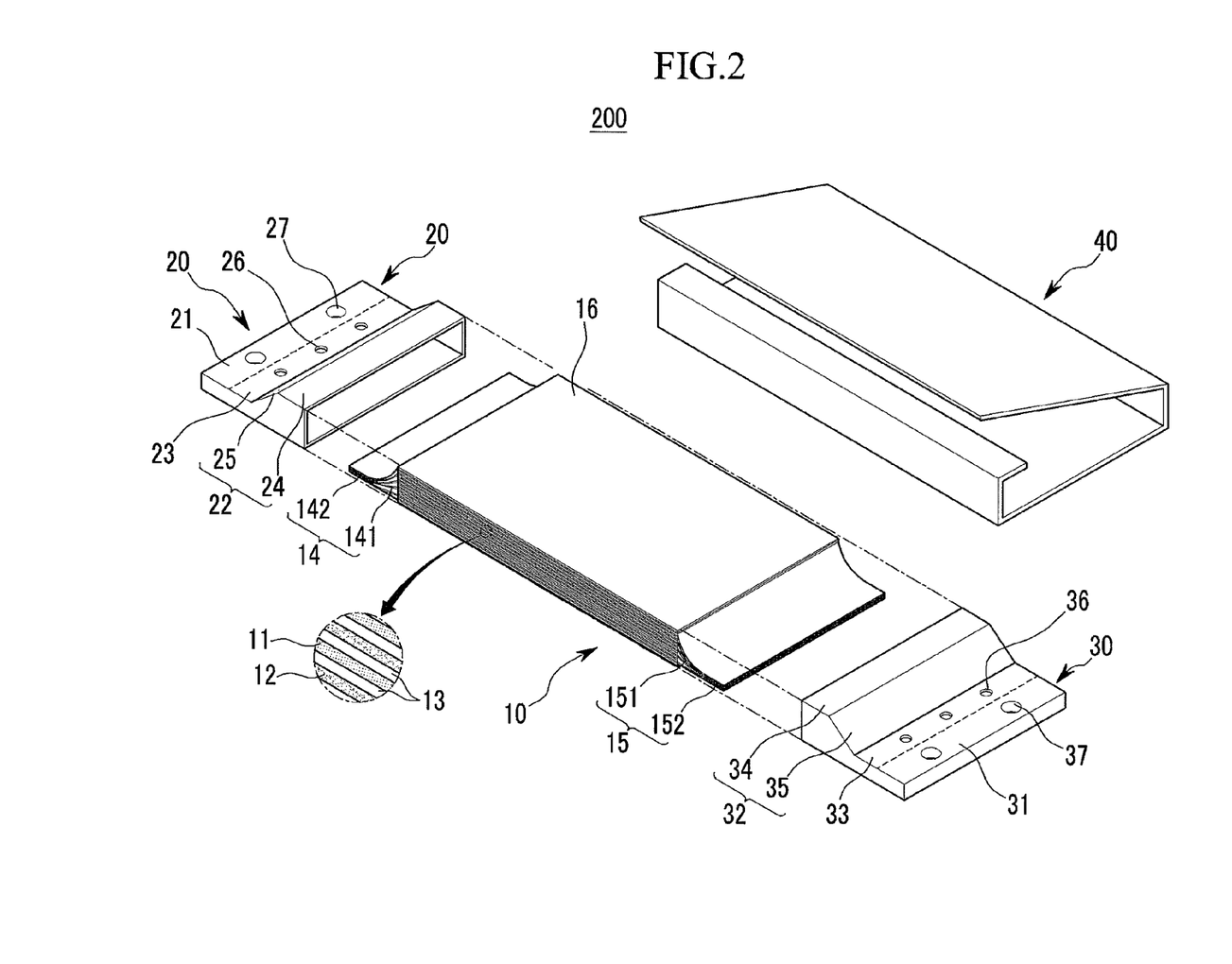
FIG. 2 is an exploded perspective view of the rechargeable battery shown in FIG. 1.

FIG. 1 is a perspective view of a rechargeable battery according to a first embodiment of the present invention, and FIG. 2 is an exploded perspective view of the rechargeable battery shown in FIG. 1.

Referring to FIGS. 1 and 2, a rechargeable battery 200 according an embodiment includes an electrode group 10. The rechargeable battery may also include a positive electrode case 20, a negative electrode case 30, and a central case 40 that divide the electrode group 10 into three areas and that house the electrode group 10. The positive electrode case 20 and the negative electrode case 30 may enclose one end portion and the opposite end portion of the electrode group 10, respectively, and the central case 40 may enclose the entire central portion of the electrode group 10 and a part of the positive electrode case 20 and the negative electrode case 30.

The electrode group 10 may be formed by winding in a jelly roll form. The electrode group 10 may be in a stack formed by folding in a zigzag method. The electrode group 10 may also be a stack of a positive electrode, a negative electrode, and a separator that are formed from a single plate. FIG. 2 illustrates a stacked electrode group. In the electrode group 10, the positive electrode 11 and the negative electrode 12 are alternately repeatedly stacked with a separator 13 interposed therebetween. The separator 13 may have a smaller width than the positive electrode 11 and the negative electrode 12, and may be disposed at a predetermined distance from edges of the positive electrode 11 and the negative electrode 12.

Thereby, a portion of the positive electrode 11 may be exposed to the outside of the separator 13 at one end portion of the electrode group 10, and a portion of the negative electrode 12 may be exposed to the outside of the separator 13 at the other end portion of the electrode group 10. The exposed portion of the positive electrode 11 may be a positive electrode uncoated portion 14 in which a positive electrode active material is not coated in a positive electrode current collector, and a portion of the exposed negative electrode 12 is a negative electrode uncoated portion 15 in which a negative electrode active material is not coated in a negative electrode current collector.

Therefore, the electrode groups 10 and 110 may be divided into a central portion 16 at which the separator 13 is positioned, the positive electrode uncoated portion 14 that is positioned at a one end portion of the central portion 16, and the negative electrode uncoated portion 15 that is positioned at an opposite end portion of the central portion 16.

Edges of the positive electrode uncoated portion 14 and the negative electrode uncoated portion 15, respectively, may closely contact each other, for example, by pressing, and may be bonded, for example by welding. For convenience, respective portions that are disposed toward one point in the positive electrode uncoated portion 14 and the negative electrode uncoated portion 15 will be referred to as curve portions 141 and 151, and respective bonded regions will be referred to as a positive electrode current collecting portion 142 and a negative electrode current collecting portion 152.

The positive electrode current collecting portion 142 and the negative electrode current collecting portion 152 may be positioned at the center of the electrode group 10 in the direction of the thickness of the electrode group 10, or may be positioned to one side of the electrode group 10 in the direction of the thickness of the electrode group 10. FIG. 2 illustrates the second case.

Figure 3:
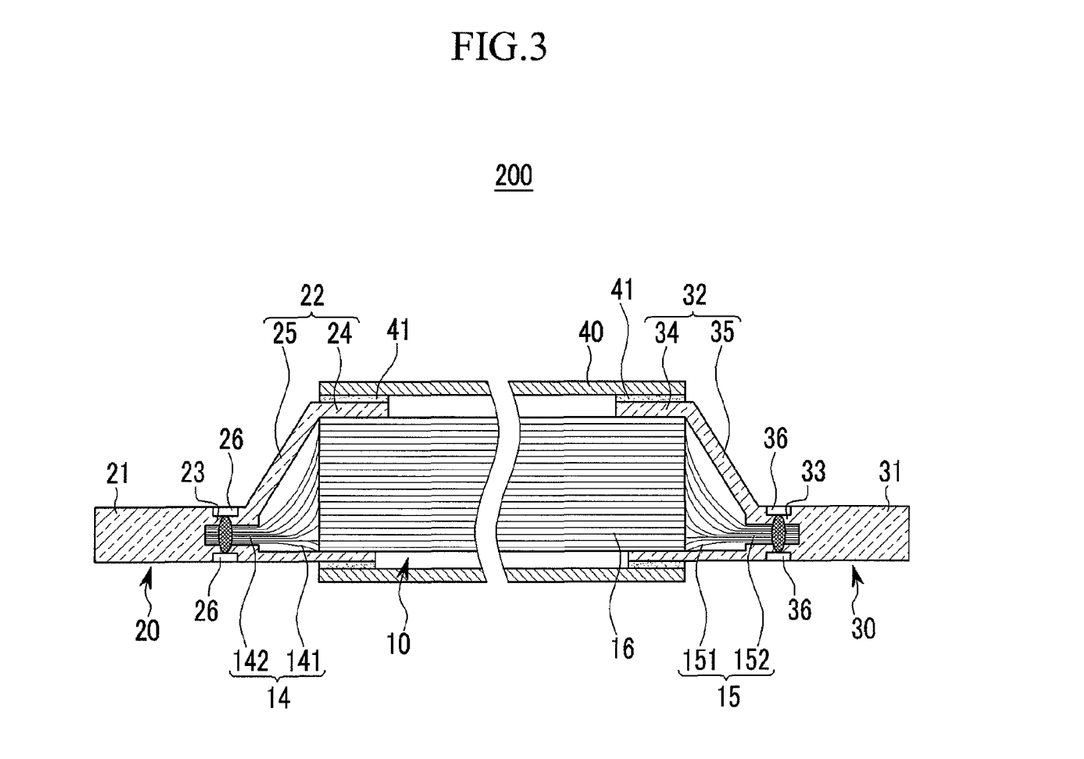
FIG. 3 is a cross-sectional view of the rechargeable battery of FIG. 1.

FIG. 3 is a cross-sectional view of the rechargeable battery of FIG. 1.

Referring to FIGS. 1 and 3, the positive electrode case 20 is coupled to the positive electrode current collecting portion 142 to be electrically connected thereto, and is integrally formed with a positive electrode terminal 21 that is protruded to the outside. The negative electrode case 30 may be coupled to the negative electrode current collecting portion 152 to be electrically connected thereto, and is integrally formed with a negative electrode terminal 31 that is protruded to the outside. The positive electrode case 20 and the negative electrode case 30 may each be formed with a hard metal having high electrical conductivity.

The positive electrode case 20 can include a first receiving portion 22 that encloses the curve portion 141 and a part of a central portion 16 toward the curve portion 141, a second receiving portion 23 that is positioned at the outside of the first receiving portion 22 and that encloses the positive electrode current collecting portion 142, and the positive electrode terminal 21 that is positioned at the outside of the second receiving portion 23. The first receiving portion 22, the second receiving portion 23, and the positive electrode terminal 21 may be integrally connected.

The first receiving portion 22 may be formed in an approximately rectangular parallelepiped shape having one opened side surface, and a side surface thereof can include a linear portion 24 that is opposite to the central portion 16 and an inclined portion 25 that covers the curve portion 141.

When the positive electrode current collecting portion 142 is positioned at the center of the electrode group 10 in a direction of the thickness of the electrode group 10, each of the inclined portions 25 may be positioned at an upper part and a lower part of the curve portion 141. Alternatively, when the positive electrode current collecting portion 142 is positioned at one side in a direction of the thickness of the electrode group 10, one inclined portion 25 may be positioned at the outside of the curve portion 141. FIG. 2 illustrates the second case.

The second receiving portion 23 may form an internal space into which the positive electrode current collecting portion 142 is inserted. The positive electrode current collecting portion 142 may be fixed to the second receiving portion 23 by welding. For this purpose, the second receiving portion 23 can have at least one recess portion 26 and thus partially reduce a thickness thereof, and the second receiving portion 23 and the positive electrode current collecting portion 142 may be fixed by spot welding at the recess portion 26. Two recess portions 26 may be formed symmetrical to each other at an upper surface and a lower surface of the second receiving portion 23.

Therefore, the entire positive electrode case 20 including the positive electrode terminal 21 may be electrically connected to the positive electrode 11 by coupling of the second receiving portion 23 and the positive electrode current collecting portion 142. In this way, the positive electrode case 20 can perform various functions as an input terminal, an output terminal, and a casing structure.

The negative electrode case 30 may have the same shape as that of the positive electrode case 20, and a second receiving portion 33 and the negative electrode current collecting portion 152 may be integrally fixed by welding and thus the entire negative electrode case 30 including the negative electrode terminal 31 may be electrically connected to the negative electrode 12. In FIG. 3, reference numeral 32 can indicate a first receiving portion of the negative electrode case 30, and reference numerals 34 and 35 can indicate a linear portion and an inclined portion, respectively, of the first receiving portion 32. Reference numeral 36 can indicate a recess portion of the second receiving portion 33.

The central case 40 can enclose the entire central portion 16 of the electrode group 10 and portions of the first receiving portions 22 and 32 of the positive electrode case 20 and the negative electrode case 30, and may be bonded to the positive electrode case 20 and the negative electrode case 30. The central case 40 can be formed with a laminate sheet in which a metal layer and a resin layer are bonded by an adhesive layer.

The central case 40 may be bonded to an outer surface of the linear portions 24 and 34 of the positive electrode case 20 and the negative electrode case 30 by thermal bonding. In FIG. 3, reference numeral 41 can indicate a sealing portion of the positive electrode case 20 and the central case 40 and a sealing portion of the negative electrode case 30 and the central case 40.

Therefore, the sealing portion 41 of the positive electrode case 20 and the central case 40 may correspond to the central portion 16 of the electrode group 10, and may be positioned at the inside of a bonding portion of the positive electrode current collecting portion 142 and the second receiving portion 23. The sealing portion 41 of the negative electrode case 30 and the central case 40 can also correspond to the central portion 16 of the electrode group 10, and be positioned at the inside of a bonding portion of the negative electrode current collecting portion 152 and the second receiving portion 33.

In the rechargeable battery 200 of the above-described structure, the sealing portion 41 of the cases 20, 30, and 40 can be positioned at the inside of the positive electrode current collecting portion 142 and the negative electrode current collecting portion 152, and the positive electrode terminal 21 and the negative electrode terminal 31 can be respectively positioned at the outside of the positive electrode current collecting portion 142 and the negative electrode current collecting portion 152, and thus an outer portion width of the electrode group 10 that does not contribute to an actual battery reaction of the entire rechargeable battery 200 can be effectively reduced.

Therefore, by increasing battery capacity by increasing a width of the electrode group 10 to the size of the rechargeable battery, or by decreasing an outer portion width of the electrode group 10 to the size of the electrode group, a more compact rechargeable battery can be manufactured. Therefore, in the rechargeable battery 200 of the first embodiment, because spatial utility can be increased, it is advantageous for forming the rechargeable battery 200 to have high capacity and a compact size.

Furthermore, the central case 40 that may be formed with a laminate sheet need not have a bending portion. That is, instead of the central case 40, the positive electrode case 20 and the negative electrode case 30 may have a bending portion (border portion of a linear portion and an inclined portion), and because the positive electrode case 20 and the negative electrode case 30 may be formed with a hard metal, the bending portion need not have an influence on strength of the cases.

Therefore, the central case 40 does not have a structural weakness due to deep drawing, and may have a thickness of 0.15 mm to 1 mm, preferably 0.2 mm to 0.5 mm, more than a common laminate sheet. Therefore, the rechargeable battery 200 of the first illustrated embodiment can embody a thick battery having an entire thickness of 10 mm or more, and can more securely protect the electrode group 10, and can minimize damage due to an external impact or vibration by increasing structural stability.

In FIGS. 1 and 2, the positive electrode terminal 21 and the negative electrode terminal 31 can have at least one opening 27 and 37. The openings 27 and 37 can couple a connection member (not shown), and the connection member may be used when forming a battery module by coupling several rechargeable batteries 200 in series or in parallel.

Figure 4:
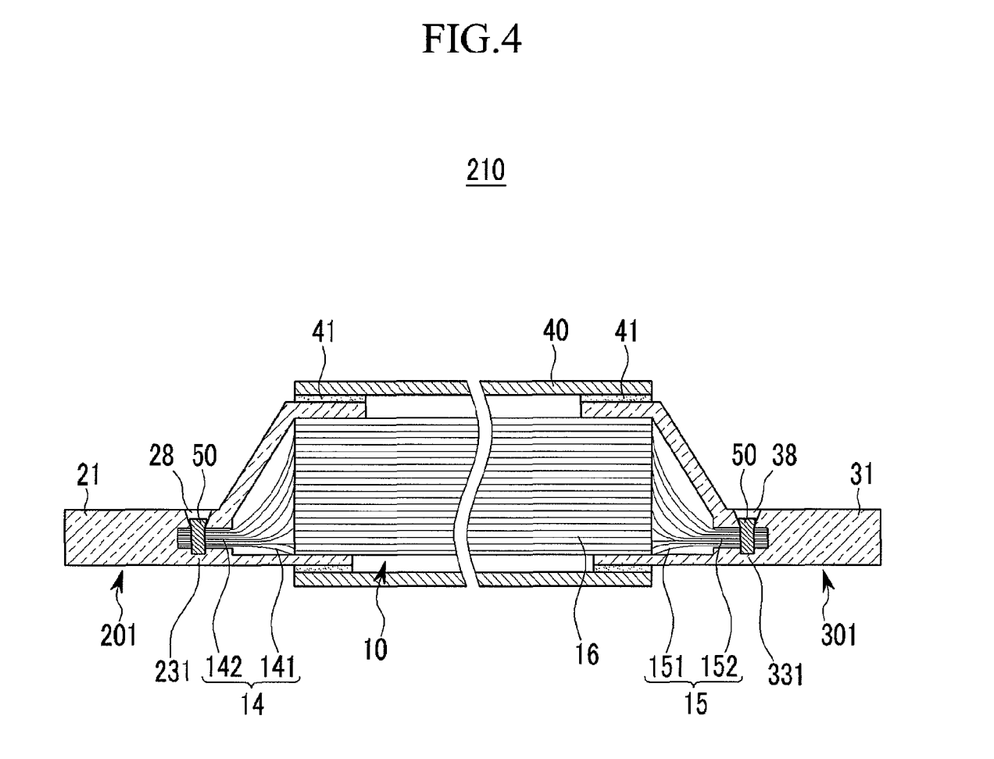
FIG. 4 is a cross-sectional view of a rechargeable battery according to another embodiment of the present invention.

FIG. 4 is a cross-sectional view of a rechargeable battery according to a second embodiment of the present invention.

Referring to FIG. 4, a rechargeable battery 210 according to the second embodiment may have a configuration similar to the rechargeable battery of the first embodiment, except for a structure of coupling a positive electrode current collecting portion 142 to a second receiving portion 231 of a positive electrode case 201 using a conductive fastening member 50, and coupling a negative, electrode current collecting portion 152 to a second receiving portion 331 of a negative electrode case 301. In the second embodiment, the coupling can occur by a structure such as a rivet or a bolt, instead of a welding process. Like reference numerals designate like elements of the rechargeable battery of the first illustrated embodiment.

At least one of openings 28 and 38 that expose the positive electrode and negative electrode current collecting portions 142 and 152 may be formed in the second receiving portions 231 and 331 of the positive electrode and negative electrode cases 201 and 301, respectively, and openings corresponding to the openings 28 and 38 of the second receiving portions 231 and 331 may also be formed in the positive electrode and negative electrode current collecting portions 142 and 152, respectively. Thereby, the fastening members 50 can fix the positive electrode and negative electrode current collecting portions 142 and 152 to the positive electrode and negative electrode cases 201 and 301 by penetrating through the second receiving portion 231 and the positive electrode current collecting portion 142, and by penetrating through the second receiving portion 331 and the negative electrode current collecting portion 152, respectively.

Figure 5:
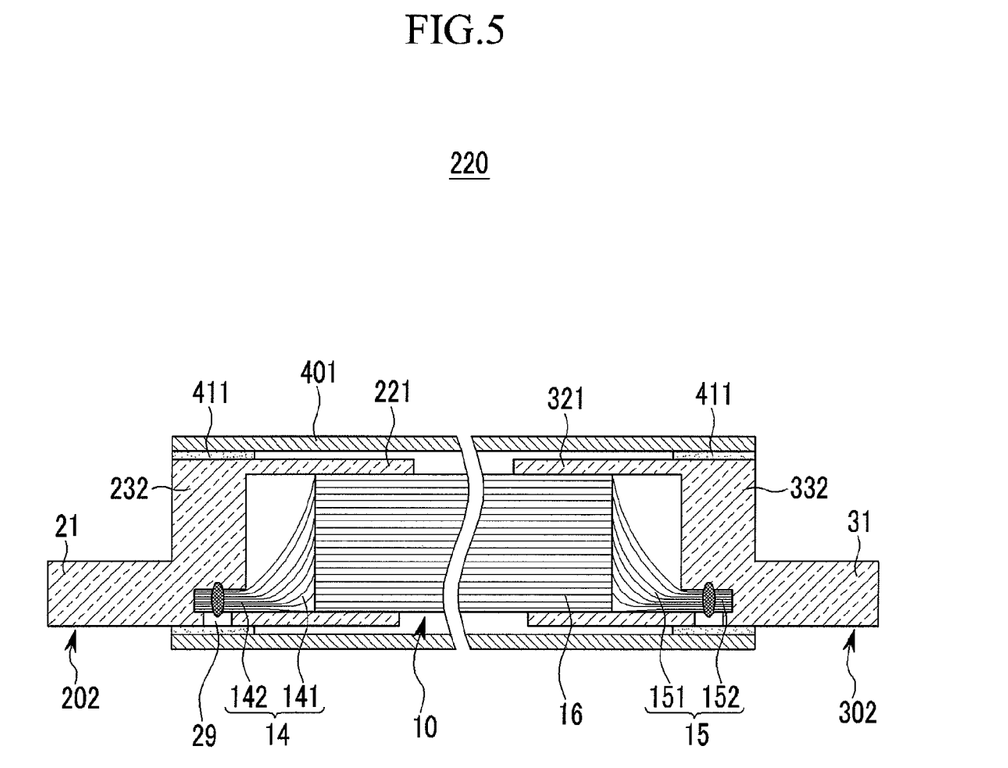
FIG. 5 is a cross-sectional view of a rechargeable battery according to a third embodiment of the present invention.

FIG. 5 is a cross-sectional view of a rechargeable battery according to a third embodiment of the present invention.

Referring to FIG. 5, a rechargeable battery 220 according to the third embodiment has a configuration similar to the rechargeable battery of the first embodiment, except that first receiving portions 221 and 321 of positive electrode and negative electrode cases 202 and 302 are formed in a rectangular parallelepiped shape in which both side surfaces of the first receiving portions 221 and 321 are opened without inclined portions, and second receiving portions 232 and 332 are formed to be orthogonal to the first receiving portions 221 and 321 at the outside of the first receiving portions 221 and 321. Like reference numerals designate like elements of the rechargeable battery of the first illustrated embodiment.

The first receiving portion 221 of the positive electrode case 202 encloses a part of a central portion 16 and an entire curve portion 141 of the electrode group 10, and the second receiving portion 232 thereof is formed orthogonal to the first receiving portion 221 and the positive electrode terminal 21. The second receiving portion 232 forms at least one opening 29 that exposes an positive electrode current collecting portion 142, and in the opening 29, the positive electrode current collecting portion 142 and the second receiving portion 232 may be fixed by spot welding. The negative electrode case 302 may be formed in the same shape and manner as that of the positive electrode case 202.

A central case 401 can enclose the entire central portion 16 of the electrode group 10 and the first and second receiving portions 221 and 232 of the positive electrode case 202, and the first and second receiving portions 321 and 332 of the negative electrode case 302, and may be bonded by thermal bonding to the second receiving portions 232 and 332. In this case, a sealing portion 411 of the positive electrode and negative electrode cases 202 and 302 and the central case 401 may be disposed at the same line as that of the positive electrode and negative electrode current collecting portions 142 and 152 in a direction of the thickness of the electrode group 10.

In the rechargeable battery 220 according to the third illustrated embodiment, by increasing the thickness of the second receiving portions 232 and 332 and increasing an overlapping area of the central case 401 relative to the positive electrode case 202 and the negative electrode case 302, structural stability of the rechargeable battery 220 can be improved.

While embodiments of this invention has been described, it is to be understood that the invention is not limited to the disclosed embodiments, but, on the contrary, is intended to cover various modifications and equivalent arrangements included within the spirit and scope of the appended claims.

What is claimed is:
1. A rechargeable battery comprising:
   a central electrode portion comprising a positive electrode, a negative electrode and a separator;
   a first electrode portion extending from a first end of the central electrode portion;

a second electrode portion extending from a second end of the central electrode portion opposite the first end;

a central case having an inner surface and an outer surface enclosing the central electrode portion respectively having a first and a second opening having first and second dimensions;

a first electrode case having an inner and outer surface and enclosing the first electrode portion, wherein the first electrode case is coupled to the central case the first electrode case being dimensioned to have dimensions corresponding to the first dimensions of the first opening so as to be positioned within the first opening in the central case such that an overlapping part of the first electrode case encloses a part of the central electrode portion at the first end, and the central case encloses the overlapping part of the first electrode case such that the inner surface of the central case is positioned adjacent the outer surface of the first electrode case; and a second electrode case having an inner and outer surface and enclosing the second electrode portion, wherein the second electrode case is coupled to the central case the second electrode case being dimensioned so as to have dimensions corresponding to the second dimension of the second opening so as to be positioned within the second opening in the central case such that an overlapping part of the second electrode case encloses a part of the central electrode portion at the second end, and the central case encloses the overlapping part of the second electrode case such that the inner surface of the central case is positioned adjacent the outer surface of the second electrode case.

2. The rechargeable battery of claim 1, wherein the central case comprises a material that is different from at least one of the first and second electrode cases.

3. The rechargeable battery of claim 1, wherein the central case comprises a laminate sheet in which a metal layer and a resin layer are bonded by an adhesive layer, and the first and second electrode cases comprise a hard metal.

4. The rechargeable battery of claim 1, wherein at least one of the first and second electrode cases are bent at an angle.

5. The rechargeable battery of claim 1, wherein at least one of the first and second electrode cases are bent at a substantially perpendicular angle.

6. The rechargeable battery of claim 1, wherein the first and second electrode portions each comprises a curved portion and a current collecting portion.

7. The rechargeable battery of claim 6, wherein:
the first electrode case comprises a first receiving part enclosing the curved portion of the first electrode portion, and a second receiving part enclosing the current collecting portion of the first electrode portion; and
the second electrode case comprises a first receiving part enclosing the curved portion of the second electrode portion; and a second receiving part enclosing the current collecting portion of the second electrode portion.

8. The rechargeable battery of claim 7, wherein the overlapping part of at least one of the first or second electrode cases and the corresponding second receiving part of the at least one of the first or second electrode cases are substantially parallel to each other and the first receiving part has an inclined portion which is inclined at an angle between the overlapping part and the corresponding second receiving part.

9. The rechargeable battery of claim 7, wherein the overlapping part of at least one of the first or second electrode cases and the corresponding second receiving part of the at least one of the first or second electrode cases are substantially parallel to each other and the first receiving part is substantially perpendicular between the overlapping part and the corresponding second receiving part.

10. The rechargeable battery of claim 1, further comprising a seal between the overlapping part of at least one of the first or second electrode cases and the central case.

11. The rechargeable battery of claim 7, further comprising a seal between the second receiving part of at least one of the first or second electrode cases and the central case, wherein the at least one of the first or second electrode cases is bent at a substantially perpendicular angle.

12. The rechargeable battery of claim 7, wherein the current collecting portion of at least one of the first or second electrode portions is fixed to the corresponding first or second electrode case at a recess formed on the second receiving part of the corresponding first or second electrode case.

13. The rechargeable battery of claim 7, wherein the current collecting portion of at least one of the first or second electrode portions is fastened to the corresponding first or second electrode case through an opening formed in the second receiving part of the corresponding first or second electrode case and an opening formed in the current collecting portion of the corresponding first or second electrode portion.

14. The rechargeable battery of claim 13, wherein the first or second electrode portion is fastened to the corresponding first or second electrode case by a conductive fastening member.

15. A rechargeable battery comprising:
a central electrode portion comprising a positive electrode, a negative electrode and a separator;
a first electrode portion extending from a first end of the central portion;
a second electrode portion extending from a second end of the central portion opposite the first end;
a central case having an inner and outer surface enclosing the central electrode portion wherein the central case has a first and a second opening respectively having first and second dimensions;
a first electrode case having an inner and outer surface and enclosing the first electrode portion wherein the first electrode case is positioned within the first opening so as to be coupled to the central case such that an overlapping part of the first electrode case encloses a part of the central electrode potion at the first end and the central case encloses the overlapping part of the first electrode case and such that the inner wall of the central case is positioned adjacent the outer wall of the first electrode case; and
a second electrode case enclosing the second electrode portion;
wherein at least one of the first or second electrode cases is bent.

16. The rechargeable battery of claim 15, wherein at least one of the first or second electrode cases is bent at a substantially perpendicular angle.

17. The rechargeable battery of claim 15, wherein at least one of the first and second electrode portions comprises a curved portion and a current collecting portion.

18. The rechargeable battery of claim 17, wherein:
the first electrode case comprises a first receiving part enclosing the curved portion of the first electrode portion, and a second receiving part enclosing the current collecting portion of the first electrode portion; and
the second electrode case comprises a first receiving part enclosing the curved portion of the second electrode portion; and a second receiving part enclosing the current collecting portion of the second electrode portion.

19. The rechargeable battery of claim 16, wherein at least one of the first or second electrode cases is bent at an angle between the first and second receiving parts of the at least one of the first or second electrode cases.

20. The rechargeable battery of claim 19, wherein the first and second receiving parts of at least one of the first or second electrode cases are substantially perpendicular to each other.

21. The rechargeable battery of claim 18, wherein the current collecting portion of the first electrode portion is fixed to the first electrode case at a recess formed on the second receiving part of the first electrode case, or the current collecting portion of the second electrode portion is fixed to the second electrode case at a recess formed on the second receiving part of the second electrode case.

22. The rechargeable battery of claim 18, wherein the current collecting portion of the first electrode portion is fastened to the first electrode case through an opening formed in the second receiving part of the first electrode case and a corresponding opening formed in the current collecting portion of the first electrode portion, or wherein the current collecting portion of the second electrode portion is fastened to the second electrode case through an opening formed in the second receiving part of the of the second electrode case and a corresponding opening formed in the current collecting portion of the second electrode portion.

23. The rechargeable battery of claim 22, wherein the current collecting portion of at least one of the first or second electrode portions is fastened by a metal fastener.

24. The rechargeable battery of claim 18, further comprising an electrode terminal coupled with the second receiving part of the first electrode case or the second receiving part of the second electrode case.

25. The rechargeable battery of claim 16, wherein at least one of the first or second electrode cases comprises an electrode terminal.

26. The rechargeable battery of claim 15, wherein the central case comprises a material that is different from at least one of the first and second electrode cases.

27. The rechargeable battery of claim 15, wherein the central case comprises a laminate sheet in which a metal layer and a resin layer are bonded by an adhesive layer, and the first and second electrode cases comprise a hard metal.

* * * * *